United States Patent
Hamad et al.

(10) Patent No.: US 8,454,832 B2
(45) Date of Patent: Jun. 4, 2013

(54) SUPPORTED IONIC LIQUID MEMBRANE SYSTEM AND PROCESS FOR AROMATIC SEPARATION FROM HYDROCARBON FEEDS

(75) Inventors: Esam Zaki Hamad, Dhahran (SA); Ahmad Abdullah Bahamdan, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 390 days.

(21) Appl. No.: 12/955,356

(22) Filed: Nov. 29, 2010

(65) Prior Publication Data

US 2012/0132589 A1    May 31, 2012

(51) Int. Cl.
*B01D 61/38* (2006.01)
*B01D 61/36* (2006.01)
*B01D 69/10* (2006.01)

(52) U.S. Cl.
USPC .......... 210/640; 210/652; 210/651; 210/653; 210/511; 210/502.1

(58) Field of Classification Search
None
See application file for complete search history.

(56) References Cited

U.S. PATENT DOCUMENTS

| | | | |
|---|---|---|---|
| 3,410,794 A | 11/1968 | Li | |
| 3,719,590 A | 3/1973 | Li et al. | |
| 4,359,596 A | 11/1982 | Howard et al. | |
| 4,411,790 A | 10/1983 | Arod et al. | |
| 4,929,358 A | 5/1990 | Koenitzer | |
| 5,039,418 A | 8/1991 | Schucker | |
| 5,063,186 A | 11/1991 | Schucker | |
| 5,075,006 A | 12/1991 | Schucker | |
| 5,220,106 A | 6/1993 | Boate et al. | |
| 5,221,481 A | 6/1993 | Schucker | |
| 5,241,039 A | 8/1993 | Ho et al. | |
| 5,512,179 A | 4/1996 | Bruschke et al. | |
| 5,643,442 A | 7/1997 | Sweet et al. | |
| 5,905,182 A | 5/1999 | Streicher et al. | |
| 5,914,435 A | 6/1999 | Streicher et al. | |
| 5,928,518 A | 7/1999 | Schafer-Treffenfeldt et al. | |
| 6,024,880 A | 2/2000 | Ciora et al. | |
| 6,180,008 B1 | 1/2001 | White | |

(Continued)

FOREIGN PATENT DOCUMENTS

DE  102006024397    10/2007
EP  0 366 844 A1     5/1990

(Continued)

OTHER PUBLICATIONS

H. Olivier-Bourbigou et al., "Ionic liquids: perspectives for organic and catalytic reactions." J. Mol. Calal. A-Chem. (2002), vol. 182-183, 419-437.

(Continued)

*Primary Examiner* — Krishnan S Menon
(74) *Attorney, Agent, or Firm* — Abelman, Frayne & Schwab

(57) ABSTRACT

A system and process for treating a hydrocarbon feed mixture containing aromatic compounds is provided to separate the at least one aromatic compound from the hydrocarbon feed stream is provided. A supported ionic liquid membrane, which is a microporous polymeric support containing ionic liquid in its pores, is used to selectively extract aromatics. The hydrocarbon feed mixture is directed to a retentate side of the supported ionic liquid membrane. A permeate stream is drawn from the permeate, side of the supported ionic liquid membrane, which is an aromatic-rich hydrocarbon stream. An aromatic-lean hydrocarbon stream, which is the retentate portion of the original hydrocarbon feed, remains on the retentate side of the supported ionic liquid membrane.

14 Claims, 2 Drawing Sheets

U.S. PATENT DOCUMENTS

| | | |
|---|---|---|
| 6,187,987 B1 | 2/2001 | Chin et al. |
| 6,273,937 B1 | 8/2001 | Schucker |
| 6,524,469 B1 | 2/2003 | Schucker |
| 6,579,343 B2 | 6/2003 | Brennecke et al. |
| 6,767,384 B1 | 7/2004 | Vu et al. |
| 7,001,504 B2 | 2/2006 | Schoonover |
| 7,018,527 B2 | 3/2006 | White et al. |
| 7,048,846 B2 | 5/2006 | White et al. |
| 7,314,565 B2 | 1/2008 | Sabottke et al. |
| 7,318,898 B2 | 1/2008 | Sabottke |
| 7,341,663 B2 | 3/2008 | Offeman et al. |
| 7,459,072 B2 | 12/2008 | Bitterlich et al. |
| 7,619,129 B2 | 11/2009 | Jong et al. |
| 2002/0139719 A1 | 10/2002 | Minhas et al. |
| 2002/0189444 A1 | 12/2002 | Brennecke et al. |
| 2005/0221193 A1 | 10/2005 | Kinouchi et al. |
| 2006/0131235 A1 | 6/2006 | Offeman et al. |
| 2008/0011680 A1 | 1/2008 | Partridge et al. |
| 2008/0035574 A1 | 2/2008 | Sabottke et al. |

FOREIGN PATENT DOCUMENTS

| | | |
|---|---|---|
| EP | 1466894 A1 | 10/2004 |
| GB | 1146105 | 3/1969 |
| JP | 2138136 | 5/1990 |
| KR | 20040031921 | 4/2004 |
| WO | 2005061422 A1 | 7/2005 |
| WO | 2008021069 A1 | 2/2008 |

OTHER PUBLICATIONS

International Preliminary Report on Patentability, Nov. 17, 2012, PCT/US2011/061166, pp. 1-4.

International Search Report and Written Opinion, Mar. 29, 2012, PCT/US2011/061166, pp. 1-7.

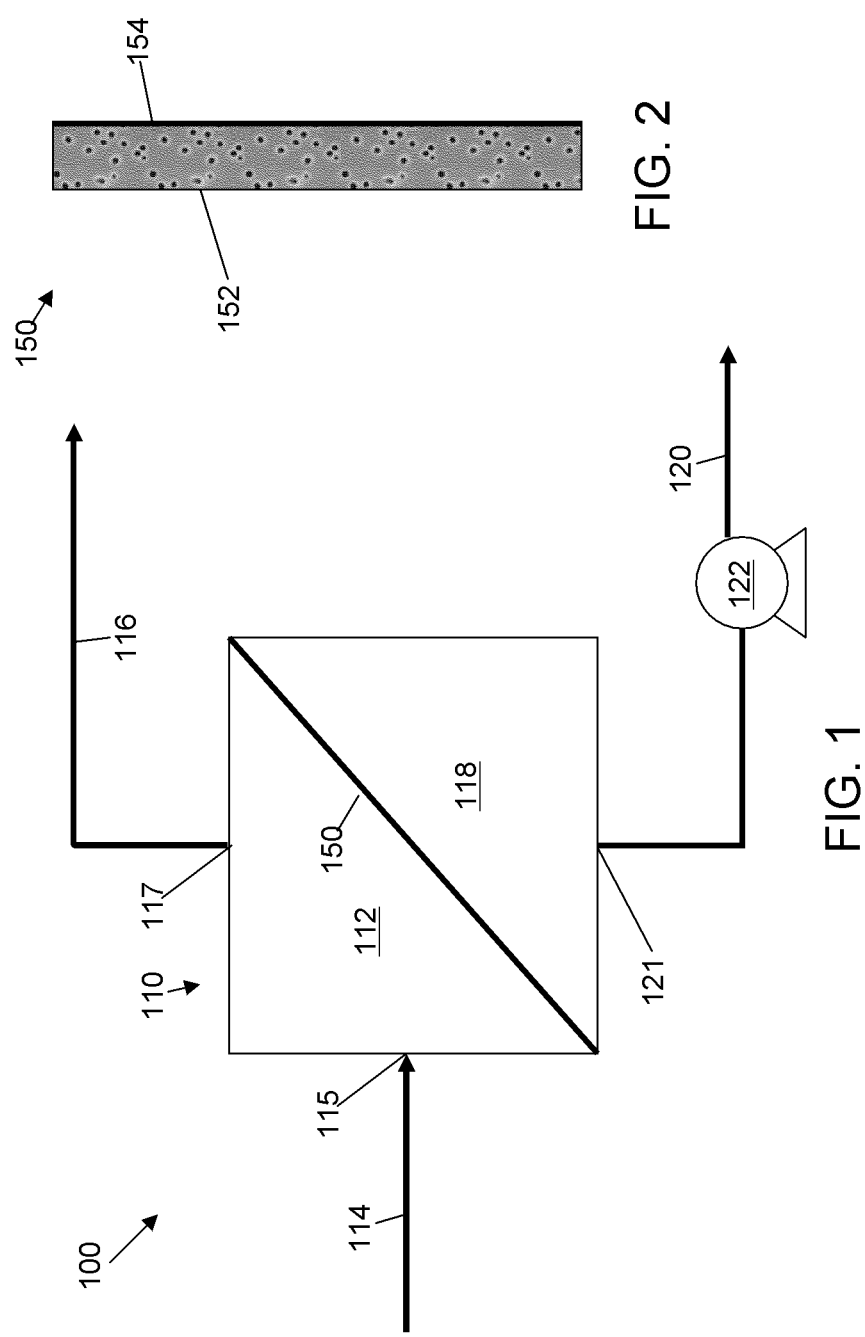

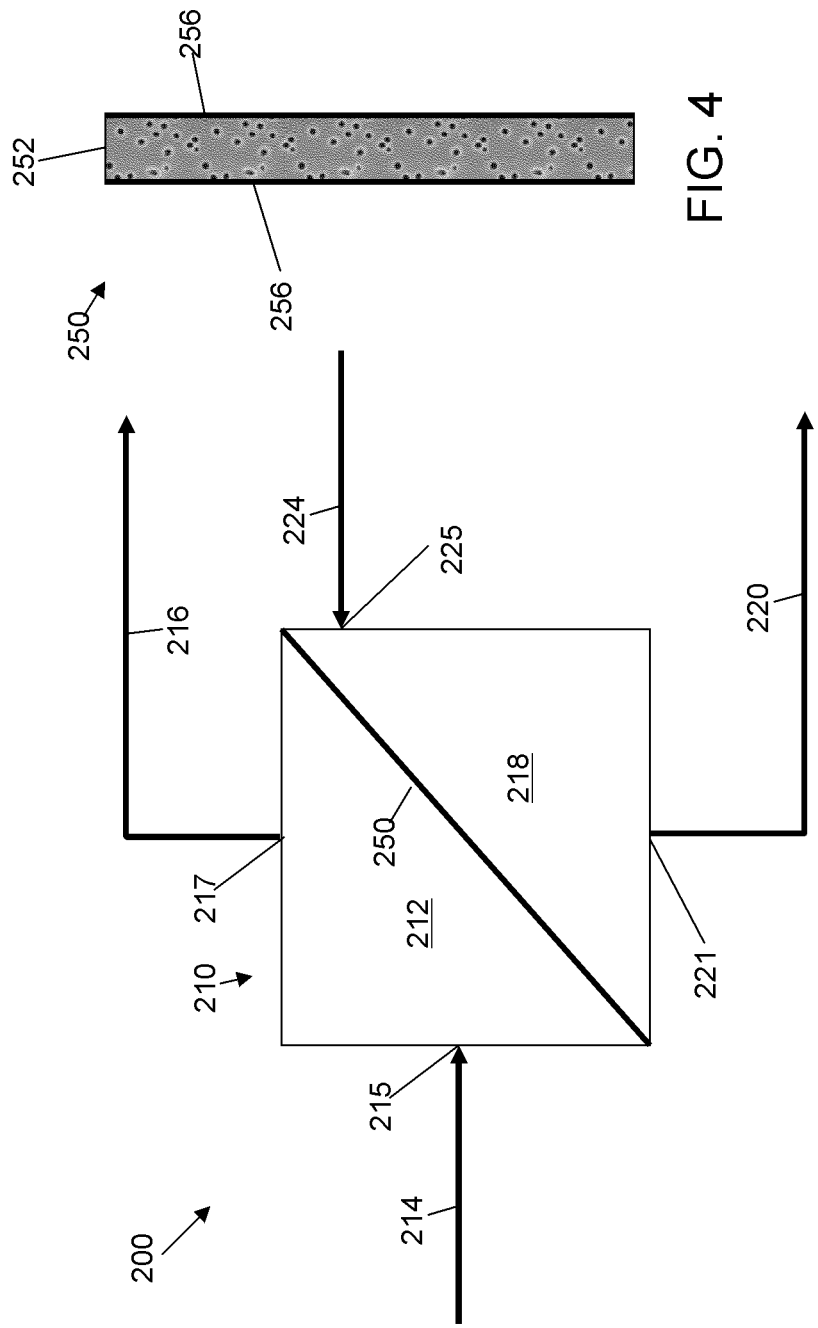

SUPPORTED IONIC LIQUID MEMBRANE SYSTEM AND PROCESS FOR AROMATIC SEPARATION FROM HYDROCARBON FEEDS

RELATED APPLICATIONS

Not applicable.

BACKGROUND OF THE INVENTION

1. Field of the Invention

This invention relates to a process for separation of aromatic compounds from a hydrocarbon feed, and more particularly to a supported liquid membrane process for aromatic separation.

2. Description of Related Art

Aromatic compounds such as benzene, toluene and xylene have significant commercial value as intermediate products for use in many commodity chemicals and polymers, including styrene, phenol (via cumene), and cyclohexane. Useful products derived from these aromatics include nylons, polyurethanes, polyesters, resins, and plasticizers.

Nonetheless, until recently, there has been little incentive to undertake the expense and effort to remove aromatics, e.g., benzene, from one of its most abundant sources, cracked naphtha. However, new regulations passed by the Unites States Environmental Protection Agency require that the benzene content of gasoline be reduced to an annual refinery average of 0.62 volume % by 2011. Many other nations have followed suit to minimize the health impacts that benzene has on humans and animals as a known carcinogen.

Separation of aromatic compounds from hydrocarbon mixtures containing aliphatic and aromatic compounds has been practiced for considerable time. Particular care must be taken with compounds that have similar properties, e.g., boiling points. Ordinary distillation is generally ineffective to separate aromatics from azeotropes, i.e., mixtures in which aliphatic compounds have boiling points similar to the aromatics. Certain compounds can be separated using azeotropic distillation, however, this process requires adding a third component to generate another lower-boiling azeotrope, and another separation is needed to remove the newly-introduced component.

Liquid-liquid extraction is another type of process employed to separate aromatics from hydrocarbon mixtures. In general, liquid-liquid extraction of aromatics employs a solvent to phase-separate an extract phase containing a target aromatic species, and a raffinate phase containing the unextracted material. However, separation of the aromatics from the hydrocarbon mixture, and the salts from the extract phase, can often prove difficult and process-intensive.

Membrane separation is another technique used to remove aromatics from a hydrocarbon mixture that can result in more complete separation without the subsequent solvent removal steps associated with liquid-liquid extraction. Existing membrane processes typically rely upon pervaporation or perstraction conditions under both elevated temperatures and pressure differentials to remove aromatics from hydrocarbons or naphtha streams. The types of membranes currently available and used in these separation processes include those based on solid polymers and ceramics.

In general, existing membrane separation technology is not effective to remove aromatics from hydrocarbon streams with a high degree of selectivity at a relatively low cost. Therefore, a need exists for an aromatic separation system and process for efficiently and effectively removing aromatics from a hydrocarbon feed containing a mixture of aromatic and non-aromatic hydrocarbons.

It is therefore desirable to provide an aromatic separation system and process that results in a benzene-lean gasoline product stream. It is also desirable to provide an aromatic separation system and process that allows for the recovery of valuable aromatics.

SUMMARY OF THE INVENTION

In accordance with one or more embodiments, a microporous polymeric support structure is provided that contains a quantity of ionic liquid in its pores, hereinafter referred to as a "supported ionic liquid membrane." The supported ionic liquid membrane is used in a system and process is provided for separating aromatics from hydrocarbon feeds.

In accordance with one or more embodiments, the supported ionic liquid membrane is used for separating aromatics from feeds of hydrocarbon mixtures under ambient temperature conditions (i.e., about 20° C. to about 30° C.) and with a lower pressure differential as compared to conventional membrane separation processes.

The hydrocarbon mixture is directed in contact with a retentate side of the supported ionic liquid membrane. An aromatic-rich permeate stream is drawn from the opposite, or permeate side of the supported ionic liquid membrane. An aromatic-lean retentate portion of the original hydrocarbon feed remains on the retentate side of the supported ionic liquid membrane.

The membrane is formed of a relatively low-cost polymer material that provides a combined use of ionic liquids with the supported liquid membrane to remove benzene and/or other aromatics from hydrocarbon streams with a high level of selectivity.

The present invention addresses the problem of decreasing the aromatic or benzene content in liquid fuels. The aromatic-lean stream can be used as a feedstock to produce fuels of low benzene or aromatic content. The aromatic-rich stream, which is a stream that is rich primarily in the aromatic compound benzene, can be utilized in different applications such as for various petrochemical processes, or the manufacture of commodity chemicals and polymers, including styrene, phenol (via cumene) and cyclohexane.

The invention solves various problems encountered removal of aromatics from hydrocarbon mixtures using membranes by advantageously combining ionic liquid extraction with a suitable yet economical microporous polymeric membrane, thereby eliminating the need to use large quantities of costly solvents or to employ extraction and distillation columns to separate ionic liquid from aromatics. This results in decreased capital and operating expenditures as compared to liquid-liquid extraction processes.

BRIEF DESCRIPTION OF THE DRAWINGS

The invention will be described in further detail below and with reference to the attached drawings in which the same or similar elements are referred to by the same number, and where:

FIG. 1 is a schematic flow diagram of a process for removing aromatics from a hydrocarbon stream using a supported ionic liquid membrane under mild pervaporation conditions;

FIG. 2 is a cross-sectional view of a membrane for use in the process shown in FIG. 1;

FIG. 3 is a schematic flow diagram of a process for removing aromatics from a hydrocarbon stream using a supported ionic liquid membrane using liquid-in and liquid-out conditions; and FIG. 4 is a cross-sectional view of a membrane for use in the process shown in FIG. 3.

DETAILED DESCRIPTION OF THE INVENTION

The present invention provides a method and system for removing aromatic hydrocarbons from a hydrocarbon feed stream in which one or more selected ionic liquid compositions are maintained within the pores of a microporous polymeric support layer to form a supported liquid membrane. Aromatic compounds pass through the membrane as a permeate phase, and aliphatic compounds are retained as a retentate phase. The ionic liquid(s) are selected to have a low affinity to the aliphatic compounds of the hydrocarbon feed stream, thereby minimizing the passage of aliphatic compounds through the membrane.

In general, a liquid hydrocarbon feed stream containing aromatic compounds, such as benzene, is directed into contact with a first side of the supported ionic liquid membrane. A permeate stream containing a portion of the aromatic compounds is drawn off from the permeate side of the supported ionic liquid membrane. The retentate is recovered and used as a feed in one or more subsequent processes to create hydrocarbon products with decreased aromatic concentration.

The ionic liquid(s) supported in the membrane pores are ionic liquid(s) selected based on their affinity for the targeted aromatic compound(s), such as benzene, toluene and xylene, and low affinity or incompatibility for the remainder of the feed, including aliphatic compounds. The low affinity of the aliphatic compounds of the hydrocarbon stream to the ionic liquid minimizes mixing between aliphatic compounds in the hydrocarbon feedstream and the ionic liquid, thereby minimizing passage of such non-targeted species.

Ionic liquids can be selective for a group of aromatic compounds, with relatively slight variation in selectivity among specific aromatic compounds. Examples include salts of pyridinium and substituted pyridinium, salts of imidazolium and substituted imidazolium, and salts of other ionic liquids, where the electrical charge in the cations are distributed in an aromatic ring. In general, ionic liquids are hydrophilic compounds with molecular chains of varying length. The hydrophobic nature of the ionic liquid can be varied, for instance, by incorporating hydrophobic moieties uniformly along the molecular chain. In certain embodiments, some degree of hydrophobicity is imparted to the ionic liquids since the hydrocarbon feedstream is some hydrophobic.

In additional embodiments, an ionic liquid or ionic liquid mixture can be selected to permit selective permeation for benzene, toluene and xylene over aliphatic compounds, for example, N-butyl-3-methyl pyridinium. The selectivity of a particular ionic liquid to aromatic compound is determined by the balance of interactions between the aromatic pi electrons and the moieties of the ionic liquid molecule.

The membrane includes a microporous polymeric support structure containing the ionic liquid. The micropores have average diameters of about 0.01 to about 50 micrometers, in certain embodiments about 0.05 to about 20 micrometers, and in further embodiments about 0.1 to about 5 micrometers.

The microporous polymeric support structure is formed of a polymeric material that is not soluble in the hydrocarbons subject to separation by the system and process of the present invention, as solubility in the feedstream will alter the behavior of the support and cause it structural deterioration. The type of polymeric material used for the microporous polymeric support structure is generally based on its compatibility with the selected ionic liquid. In particular, polymeric materials are selected which are not soluble in the selected ionic liquid.

Notably, these microporous polymeric support layers can be loaded with ionic liquid in an efficient and efficacious manner, particularly as compared to certain existing membrane separation processes employing ceramic-based membranes.

Suitable polymeric materials that are hydrophilic include polycarbonate, nylon, polyester, polyacrylates, polyacrylonitriles, polyaryletherketones, cross linked water soluble polymers such as poly vinyl alcohol, polymers based on nitrocellulose, polymers based on cellulose acetate, polyethersulfone, polyvinylidene fluoride (PVDF) and any other polymer or co-polymer with hydrophilic moieties. The hydrophilic nature or the support structure or the coating on the surface walls of the pores provides an affinity for the ionic material, thereby preventing its loss into the permeate phase. In addition, the hydrophilic material serves to minimize fouling due to hydrophobic impurities.

In embodiments in which ionic liquids are selected that have a degree of hydrophobicity, suitable support can include certain polyamides, polysulfone (hydrophobic with hydrophillicity), polyimide, and any other polymer or co-polymer, including those listed above of a hydrophilic nature, with hydrophobic moieties.

In additional embodiments, the microporous polymeric support structure is formed of a polymeric material having a suitable coating on the surface walls of the pores, e.g., hydrophilic or of a generally hydrophilic nature with hydrophobic moieties, depending on the ionic liquid to be maintained in the pores. For instance, a support material having surface-coated pores with an affinity to the ionic liquid can be prepared by dissolving a hydrophilic (or hydrophilic with hydrophobic moieties) coating in a volatile solvent, filling the pores with the solution, vaporizing the volatile solvent, and irradiating the membrane with plasma or other radiation source to chemically graft the coating to the pore wall.

In certain embodiments, the type of support material and/or the ionic liquids are selected so that the static capillary pressure difference in the pores is greater than the pressure differential across the membrane to ensure that ionic liquid is maintained in the pores and provides the desired separation functionality. This is particularly useful in embodiments operating under mild pervaporation conditions as described below with respect to FIG. 1.

The thickness of the support material can vary based on numerous factors, including the membrane cell configuration, the type of polymeric material employed for the support layer, the constituents of the hydrocarbon feed mixture, the targeted aromatic species, the pressure differential and other factors. The support material can be about 5 to about 1000 micrometers, in certain embodiments about 10 to about 500 micrometers, and in further embodiments about 10 to about 100 micrometers.

The operating temperature of the membrane systems described herein is generally determined by the bubble point and dew point of the hydrocarbon feed mixture, and in particular the boiling point of the targeted aromatic species. For instance, to maintain certain hydrocarbon feed mixture in a substantially liquid phase, the temperature can be generally about 10° C. to about 100° C., in certain embodiments about 10° C. to about 80° C., and in further embodiments, about 10° C. to about 40° C. Furthermore, the supported ionic liquid membrane can be used with certain hydrocarbon feed mixtures in a system operating under ambient temperature conditions (i.e., about 20° C. to about 30° C.).

Referring to FIG. 1, a first embodiment of the supported liquid membrane aromatic separation system 100 of the present invention is schematically depicted. System 100 includes a membrane separation unit 110 having a supported ionic liquid membrane 150 with a retentate side 112 and a permeate side 118. Unit 110 includes a hydrocarbon feed mixture inlet 115 for receiving a hydrocarbon feed mixture 114, an aromatic-lean hydrocarbon outlet 117 for discharging an aromatic-lean hydrocarbon stream 116 and an aromatic-rich hydrocarbon outlet 121 for discharging an aromatic-rich hydrocarbon stream 120. In operation, the hydrocarbon feed mixture 114 is introduced via inlet 115 to the retentate side 112. The aromatic-lean hydrocarbon stream 116 is discharged from the outlet 117 on the retentate side 112. The aromatic-rich hydrocarbon stream 120 is discharged from the permeate side 118. All or a portion of the aromatic-rich hydrocarbon stream 120 can be in a gas phase where there is a vacuum differential, in particular where the downstream pressure is below the dew point pressure of the permeate hydrocarbon mixture.

Aromatics are drawn through the membrane by the affinity of aromatics to the ionic liquid supported in the pores of the membrane. A vacuum or other pressure differential between the permeate side and the retentate side, e.g., created by a pump 122 in line with the permeate aromatic-rich hydrocarbon stream 120, causes the aromatic-rich permeate to continuously pass through the supported ionic liquid membrane 150. Notably, this pressure differential is very low as compared to conventional pervaporation membrane processes, for instance, less than 1 bar, and in certain embodiments as low as 0.1 bar.

In certain embodiments herein, and in contrast to conventional pervaporation processes for separating aromatics from streams having mixtures of aromatics and non-aromatics which feed the hydrocarbons at elevated temperature and under conditions in which the entire feedstream is in a gaseous phase, the present invention provides the hydrocarbon feed mixture 114 in substantially liquid phase.

In embodiments in which the temperature of the hydrocarbon feed mixture is below its bubble point, the feed is liquid. In embodiments in which the temperature of the hydrocarbon feed mixture is between its bubble point and its dew point, the feed is a mixture of liquid and vapor. In certain embodiments in which the temperature of the hydrocarbon feed mixture is above its dew point, the feed substantially vapor. The present process differs from conventional approaches in that the rate of diffusion of the target species is greater in liquids, including ionic liquids maintained in the pores of the present supported ionic liquid membrane, as compared to solid or swelled solid membranes. That is, in the supported ionic liquid membranes, the diffusion of the permeate takes place in the ionic liquid phase, which require a lesser pressure differential or driving force for the same target species flux.

The permeate is converted to a gas phase by virtue of the lower boiling point of the aromatic-rich hydrocarbon stream, and the lower pressure on the permeate side, rather than by an increase in the temperature of the feedstream. Advantageously, system 100 operates using a supported ionic liquid membrane that operates under mild pervaporation conditions, in contrast to conventional methods that require harsher conditions, i.e., comparatively higher temperatures and pressures to attain the same target species flux.

In accordance with one or more embodiments, the supported ionic liquid membrane includes a pervaporation layer on its permeate side. In particular, this configuration is advantageous in processes in which the permeate stream is in a vapor phase and the system operates as described herein with respect to FIG. 1. The pervaporation layer can be a relatively dense, non-porous hydrophobic layer that is coated on the support material and having a thickness of about 1 micrometer to about 10 micrometers. In certain embodiments, the pervaporation layer possesses hydrophilic characteristics on the permeate side formed, for example, by plasma treatment as is known to those of ordinary skill in the art. Hydrophobic characteristics can also be imparted, particularly if required for compatibility with certain ionic liquids with hydrophobic moieties. Suitable materials for the pervaporation layer include polyamide, polysulfone, and polyimide.

FIG. 2 is a cross-sectional view of an embodiment of a membrane 150 particularly effective for use in the supported liquid membrane aromatic separation system 100. Membrane 150 includes a microporous polymeric structure 152 in which the ionic liquid is maintained and a dense pervaporation layer 154 on surface on the permeate side of the membrane microporous polymeric structure 152. This pervaporation layer 154 serves to maintain ionic liquid within the pores of the microporous polymeric structure 152. In certain embodiments, pervaporation layer 154 is not required, in particular when the displacement pressure of the ionic liquids within the pores of the microporous polymeric structure 152 is higher than the pressure drop across the membrane, such as when the wettability, or adhesion, of the ionic liquid to the pores is high, when the pores are relatively small and/or when the interfacial tension between the feedstream and ionic liquid is high, as determined by the Young-Laplace equation.

The feed stream 114 is directed into contact with the retentate side of the supported ionic liquid membrane 150, and targeted aromatics are extracted from the feed 114 into the ionic liquids. The extracted aromatic compounds are removed from the ionic liquid by permeation through the optional dense pervaporation membrane 154 exiting the membrane 150 as the aromatic-rich hydrocarbon vapor stream 120. Due to the selection of ionic liquid having a low affinity or incompatibility to the components of the feed stream 114 other than the chosen aromatics, a majority of the remainder of the feed 114, i.e., the aliphatic compounds and other non-targeted compounds, are not extracted into the ionic liquid phase and are discharged from the retentate side as the aromatic-lean hydrocarbon stream 116.

In certain embodiments of the present invention, and referring, for instance, to FIG. 3, a sweep stream is used to remove aromatics extracted from the feed. The sweep stream can include any suitable liquid solution that readily dissolves the permeated molecules. In embodiments of the system and process of the present invention in which it is desirable to recycle the sweep solution, recover the aromatics, or both, a preferred sweep stream is one that is relatively easy to separate from the aromatic-rich hydrocarbon stream. Suitable sweep stream liquids include paraffins such as isooctane, dodecane and hexadecane; or liquid hydrocarbon mixtures such as naphtha and desulfurized diesel. The particular sweep liquid should be a liquid at room temperature and ambient pressure conditions.

With continued reference to FIG. 3, an embodiment of a supported liquid membrane aromatic separation system 200 of the present invention is shown. System 200 includes a membrane separation unit 210 having a supported ionic liquid membrane 250 with a retentate side 212 and a permeate side 218. Unit 210 includes a hydrocarbon feed mixture inlet 215 for receiving a hydrocarbon feed mixture 214, an aromatic-lean hydrocarbon outlet 217 for discharging an aromatic-lean hydrocarbon stream 216, a sweep stream inlet 225 for receiving a suitable liquid solution that readily dissolves the permeated molecules, and an aromatic-rich hydrocarbon outlet 221 for discharging stream 220 including an aromatic-rich hydrocarbon mixture and the sweep fluid. In operation, the hydrocarbon feed mixture 214 is introduced via inlet 215 to the retentate side 212. The aromatic-lean hydrocarbon stream 216 is discharged from the outlet 217 on the retentate side 212. Stream 220, including a mixture of sweep fluid and aromatic-rich hydrocarbons, is discharged from the permeate side 218. Sweep stream 224 is passed along the permeate side 218 of the membrane 250 to collect aromatics that permeate the membrane. Advantageously, the aromatic-rich stream 220, including the sweep stream, is in a liquid phase. Aromatics are drawn into and pass through the membrane as a result of the affinity of aromatics for the ionic liquid supported in the pores of the membrane.

In additional embodiments, a hydrophilic layer can be provided on both the retentate side and the permeate side to enhance adhesion of hydrophilic ionic liquids in the pores of the support material. In particular, this configuration is advantageous in processes in which the permeate stream is in a liquid phase that is drawn off by a sweep stream. A hydrophilic layer can be formed by treating the support material to a desired thickness, for instance, about 10 to about 20 nanometers, which optionally can be coated with an ionic liquid that is the same or different than the ionic liquid maintained in the pores of the support material. The hydrophilic layer permits relatively low permeability of the hydrocarbon feed and sweep stream, but a relatively high permeability of the aromatic components that are removed from the hydrocarbon feed mixture.

FIG. 4 depicts a sectional view of an embodiment of a membrane 250 particularly effective for use in the supported liquid membrane aromatic separation system 200. In a preferred embodiment, membrane 250 includes a hydrophilic microporous polymeric structure 252 in which the ionic liquid is maintained, and hydrophilic layers 256 is attached to both the retentate side and the permeate side of the microporous polymeric structure 252. It will be appreciated by one of ordinary skill in the art that one or both of these hydrophilic layers 256 can be eliminated. These hydrophilic layers 256 have a low permeability for the feed and sweeping solvents, but have a high permeability relative to the components to be removed, e.g., the selected aromatics. In addition, the hydrophilic layers 256 prevent ionic liquids from leaking from the membrane. In addition, hydrophilic layers 256 provide resistance to fouling from impurities than can be present in the feedstream.

The feed stream 214 is directed into contact with the retentate side of the supported ionic liquid membrane 250, and targeted aromatics are extracted from the feed 214 by the ionic liquids. The extracted aromatic compounds are removed from the ionic liquid by permeation through the hydrophilic layers and the hydrophilic support and exit the membrane as the aromatic-rich hydrocarbon stream 220. Ionic liquid is contained in the pores of the microporous polymeric support 252. Due to the selection of ionic liquid having a low affinity to the components of the feed stream 214 other than the chosen aromatics, a majority of the remainder of the feed 214, i.e., the aliphatic compounds and other non-targeted compounds, are not extracted into the ionic liquid phase and are discharged from the retentate side as the aromatic-lean hydrocarbon stream 216.

The membrane unit can be in any suitable configuration. For instance, the membrane unit can be in a spirally wound configuration, a plate and frame configuration, or a tubular configuration. In certain embodiments, the membrane unit is provided in a spirally wound configuration, which is known to provide increased membrane contact area in a relatively smaller volume and system footprint as compared to plate membranes.

In addition, a plurality of membrane units can optionally be operated in parallel or series. In the parallel configuration, one or more membrane units can be decommissioned for maintenance without disrupting the continuity of the aromatic separation process.

The hydrocarbon feed stream having aromatics removed can be various fractions of hydrocarbons, including but not limited to gasoline, diesel, naphtha, or light cycle oil. In certain preferred embodiments, the hydrocarbon feed is naphtha.

The aromatics to be separated can be benzene, toluene, xylene, and substituted aromatics including aromatic sulfur and nitrogen compounds. In processes in which the permeate is rich in aromatic sulfur and nitrogen compounds, downstream hydrotreatment or other heteroatom removal processes can be employed.

EXAMPLE

A polycarbonate membrane filter with pores having average diameters of 0.1 micrometers and a thickness of 10 micrometers, and having a circular shape with a diameter of 47 millimeters (GE PCTE commercially available from GE Osmonics Labstore, Minnetonka, Minn., USA) was prepared. The membrane included polyvinylpyrrolidone (PVP) as a wetting agent that imparts hydrophilicity. The membrane was coated with ionic liquid, N-butyl-3-methyl pyridinium, such that the ionic liquid was contained and supported in the pores of the membrane.

The receiving side (permeate) included a pure dodecane solution to sweep accumulated permeate from the surface of the membrane. A gear pump was connected to each side while samples were extracted from the reservoirs to measure the change in composition on both sides.

The membrane system was tested with a five component model feed described in Table 1, using a dodecane carrier as a sweep stream. The samples collected were analyzed by gas chromatography. The process was performed at a low flow rate (10 milliliters per min) for 48 hours.

TABLE 1

| | |
|---|---|
| Feed temperature (° C.) | 24 |
| Benzene, ppm | 6048 |
| Iso-octane, ppm | 9166 |
| Toluene, ppm | 8746 |
| Xylene, ppm | 8325 |
| Hexadecane, ppm | 20727 |
| Permeate flux, kilograms benzene per hour per square meter (kg/hr/m$^2$) | 0.0015 |
| Permeate flux, kilograms toluene per hour per square meter (kg/hr/m$^2$) | 0.0011 |
| Selectivity of Benzene/Toluene | 1.93 |
| Selectivity of Benzene/Xylene | 3.9 |
| Selectivity of Benzene/Iso-octane | 329 |
| Selectivity of Toluene/Iso-octane | 171 |
| Selectivity of Xylene/Iso-octane | 85 |

The results set forth in Table 1 above indicate that aromatics can be selectively removed from the feed without removing aliphatic compounds. The supported ionic liquid membrane exhibited selective permeation for benzene, toluene and xylene over aliphatic compounds.

The method and system of the present invention have been described above, in the example and the attached drawings.

Additional variations and modifications will be apparent to those of ordinary skill in the art based on the above description and the scope of the invention is to be determined by the claims that follow.

The invention claimed is:

1. A process for treating a hydrocarbon feed stream containing at least one aromatic compound to separate some or all of said at least one aromatic compound from the hydrocarbon feed stream, the process comprising:
providing a supported ionic liquid membrane including a microporous polymeric support structure formed of a polymer material and at least one ionic liquid contained in the micropores of said support structure, the supported ionic liquid membrane having a first side and a second side;
passing the hydrocarbon feed stream containing at least one aromatic compound into contact with the first side of the supported ionic liquid membrane; and
recovering a permeate stream containing the at least one aromatic compound from the second side of the supported ionic liquid membrane;
wherein a retentate portion remains on the first side of the supported ionic liquid membrane, the retentate portion comprising hydrocarbons having a reduced aromatic compound content as compared to the hydrocarbons feed stream.

2. The process of claim 1, wherein the ionic liquid is selected to have a high affinity for aromatic compounds and a low affinity for aliphatic compounds.

3. The process of claim 1, wherein the supported ionic liquid membrane further comprises a pervaporation layer on the second side.

4. The process of claim 3, wherein at least a portion of the permeate stream is in a vapor phase.

5. The process of claim 4, wherein the second side is subjected to a vacuum of less than 1 bar to increase the flux of the aromatic compound through the membrane.

6. The process of claim 4, wherein the permeate stream is drawn off by a pressure differential of less than 1 bar between the first and second sides of the supported ionic liquid membrane.

7. The process of claim 1, wherein the permeate stream is in a substantially liquid phase.

8. The process of claim 1, further comprising passing a sweep stream proximate the second side of the supported ionic liquid membrane to remove the permeate.

9. The process of claim 1, wherein the hydrocarbon feed stream is introduced to the first side of the supported ionic liquid membrane at a temperature of about 10° C. to about 100° C.

10. The process of claim 1, wherein the hydrocarbon feed stream is introduced to the first side of the supported ionic liquid membrane at a temperature of about 10° C. to about 40° C.

11. The process of claim 1, wherein the hydrocarbon feed stream is introduced to the first side of the supported ionic liquid membrane at a temperature of about 20° C. to about 30° C.

12. The process of claim 1, where a hydrophilic layer is provided on each side of the supported ionic liquid membrane.

13. The process of claim 12, further comprising passing a sweep stream proximate the second side of the supported ionic liquid membrane to remove the permeate.

14. The process of claim 12, wherein the permeate stream is in a substantially liquid phase.

* * * * *